Patented Mar. 2, 1937

2,072,212

UNITED STATES PATENT OFFICE 2,072,212

EMBEDDING MASS

Walter Moosdorf, Cologne, and Paul Wolski, Leverkusen-Wiesdorf, Germany, assignors to Winthrop Chemical Company, Inc., New York, N. Y., a corporation of New York No Drawing. Application July 26, 1935, Serial No. 33,387. In Germany August 15, 1934

6 Claims. (Cl. 18—47)

The present invention relates to an embedding mass and to a process for the preparation of cast molds.

It is known to use embedding masses containing gypsum for the preparation of cast molds. Such embedding masses and the molds prepared therefrom are, however, unsuitable for certain purposes, for instance for refined steel and gold casts because of the corrosion of the metal occurring at the high casting temperature required therefor. It is further known to use gypsum-free embedding masses which, besides other substances, are made of sand containing clay. Sodium phosphates are added to these embedding masses, whereby hardening phosphates are formed by the reaction between the clay and the sodium phosphates. It is true that molds of this composition prevent the corrosion of cast material and, therefore, represent a certain advantage over the embedding masses containing gypsum, but these molds, when heated to the casting temperature, probably because of the sintering or melting of the sodium compounds, very often show cracks and, therefore, cannot be used for the manufacture of very exact cast parts, particularly not for exact prothetic casts in dentistry.

In accordance with the present invention, this drawback can be overcome by using an embedding mass consisting of a ceramic substance hardening on burning, a substance capable of forming a hardening phosphate with phosphoric acid ions, and a practically alkali-free substance yielding phosphoric acid ions in the presence of a solvent.

The new embedding mass consists of three different components. The first component is a ceramic substance or a mixture of ceramic substances which hardens on burning. Substances of this kind are, for instance, clay, kaolin, loam, bauxite, mixtures of aluminium oxide with silicic acid, with silicates such as magnesium or aluminium silicates, or with silicic acid and silicates. It has been found very efficacious to employ a mixture of quartz flour and crystobalite as such ceramic substance. A mixture of equal parts of the latter substances has proved very suitable.

As customary in the ceramic industry, also substances of constant volume, such as chamotte, may be added.

The second component of the embedding mass consists of one or more compounds which react with phosphoric acid ions with the formation of a phosphate which hardens at ordinary temperature. Such hardening substances forming phosphates are, for instance, oxides, hydroxides, phosphates, and, if desired, also carbonates and similar readily decomposable salts for instance acetates and formiates, of the alkaline earth metals, aluminium, iron, copper, zinc, and cadmium, such as for instance zinc oxide, magnesium oxide, iron oxide, cuprous oxide, magnesium hydroxide, alumina hydrate, calcium hydroxide, barium hydroxide, aluminium phosphate, magnesium phosphate, zinc phosphate, copper phosphate, zinc carbonate, magnesium carbonate, calcium carbonate, calcium acetate, and magnesium formiate. A mixture of calcined zinc oxide and alumina hydrate has proved especially suitable.

The third component is a practically alkali-free substance yielding phosphoric acid ions in the solvent, especially in water. Such substances are, for instance, ortho- meta, and pyrophosphoric acids and their soluble, particularly water-soluble salts such as magnesium, calcium, zinc or ammonium phosphates, soluble phosphates of organic amino compounds such as dimethylamine phosphate, and, if desired, also phosphorus pentoxide or phosphoric acid esters such as, for example, methyl or ethyl phosphate. Especially acid substances yielding phosphoric acid ions in the presence of a preferably aqueous solvent such as primary magnesium phosphate and phosphoric acids have proved to be suitable. Needless to say that also mixtures of phosphoric acids, phosphorus pentoxide or phosphoric acid esters with phosphates may be used such, for instance as mixtures of zinc or magnesium phosphate with phosphoric acids.

For the manufacture of the cast molds, the model to be imitated is embedded in an embedding mass consisting of a ceramic substance hardening on burning, a substance capable of forming a hardening phosphate with phosphoric acid ions, a practically alkali-free substance yielding phosphoric acid ions in an aqueous medium, and an aqueous liquid. The proportions of the mixture depend on the conditions to which the mold to be prepared will be subjected; generally, the ceramic substance is used in excess; for instance 90 parts by weight of the ceramic substance and 10 parts by weight of the compound forming hardening phosphates, or 100 parts by weight of the ceramic substance and 30 parts by weight of the compound forming hardening phosphates are employed. The ceramic substance hardening on burning and the substance capable of forming hardening phosphates may be made into a paste with a practically alkali-free, preferably aqueous liquid containing phosphoric acid ions. After a certain time, the paste thus obtained hardens.

It is also possible to prepare a hardening embedding mass by adding water or an aqueous liquid to the solid components I and II which have previously been mixed with a solid alkali-free compound which yields phosphoric acid ions in the presence of a preferably aqueous liquid. As such compound for instance solid phosphoric acid, phosphorus pentoxide or soluble solid phosphates, for instance magnesium or zinc phosphates, may be employed. Especially water-soluble acid substances such, for instance, as phosphorus oxide and primary magnesium phosphate come into consideration.

In order to increase the wetting capacity of the embedding mass with regard to the model to be imitated, suitable wetting agents such as soaps and soap-like synthetic products such, for instance, as alcohol sulfonates, condensation products of carboxylic acids of high molecular weight with hydroxy- or amino- carboxylic or sulfonic acids, certain aromatic sulfonic acids or their condensation products with formaldehyde, reaction products of alkylene oxides and compounds of high molecular weight containing reactive hydrogen atoms, and also condensation products of fatty acids of high molecular weight with polyvalent amines may be used.

The embedding masses prepared in such a manner in many cases display considerable advantages over the known embedding masses. They form a very hard mold when hardening, which enables the reproduction of the finest details of the model. On heating to high temperatures, for instance to 2000° C., the mold is not destroyed nor does it show cracks in contradistinction to all hitherto known molds. For these reasons, the new embedding mass provides for the most exact casts, for instance from refined steels such as V2A-steels, gold, silver, and also for high melting ceramic masses such as cast porcelain and burnt porcelain. Contrary to the gypsum-containing embedding masses hitherto used, especially when using refined steels as cast material, the advantage of using the embedding mass prepared according to the present invention is to be seen in that no corrosion of the refined steel takes place, which is the case when using embedding masses containing gypsum.

While we have described our improvements in great detail and with respect to preferred embodiments thereof, we do not desire to limit ourselves to such details or embodiments, since many modifications and changes may be made and the invention embodied in widely different forms without departing from the spirit or scope of the invention in its broadest aspects. Hence we desire to cover all modifications and forms within the scope or language of any one or more of the appended claims.

In the appended claims the term "ceramic substance hardening on burning" denotes, for instance, the following substances: clay, kaolin, loam, bauxite, mixtures of aluminium oxide with silicic acid, with silicates such as magnesium- or aluminium silicate, or with silicic acid and silicates, quartz flour or crystobalite; the term "a substance capable of forming a hardening phosphate with phosphoric acid ions" denotes, for instance, oxides, hydroxides, phosphates, carbonates, acetates, and formiates of the alkaline earth metals, aluminium, iron, copper, zinc and cadmium; the term "practically alkali-free substance yielding phosphoric acid ions in the presence of a solvent" denotes, for instance, the following substances: ortho- meta- and pyrophosphoric acids and their soluble, particularly water-soluble nonalkaline salts and esters.

The following examples illustrate the invention:—

*Example 1*

60 g. of quartz flour
5 g. of kaolin
10 g. of chamotte
15 g. of aluminium oxide
5 g. of magnesium oxide
5 g. of zinc oxide are made into a paste with a liquid containing 26 g. of phosphoric acid
4 g. of magnesium oxide
1 g. of caustic lime
1 g. of zinc oxide
120 g. of water in the proportion of 100 g. to 30 ccs., whereby a creamy consistency is formed which is especially suitable for making cast molds.

*Example 2*

Instead of the 5 g. of magnesium oxide and 5 g. of zinc oxide indicated in Example 1, 10 g. of aluminium phosphate can be employed, whereby the same effect is attained.

*Example 3*

As solid component the following mixture is prepared:

57 g. of quartz flour
3 g. of kaolin
10 g. of chamotte
15 g. of aluminium oxide
5 g. of magnesium oxide
3 g. of zinc oxide
7 g. of primary magnesium phosphate.

The mixture is pasted with water only.

*Example 4*

As solid component the following mixture is prepared:

57 g. of quartz flour
5 g. of kaolin
10 g. of chamotte
23 g. of alumina hydrate containing 33% of water
10 g. of magnesium carbonate
3 g. of zinc oxide
7 g. of primary magnesium phosphate.

The mixture is pasted with water only.

We claim:—

1. An embedding mass comprising a ceramic substance hardening on burning, a substance capable of forming a hardening phosphate with phosphoric acid ions, and a practically alkali-free substance yielding phosphoric acid ions in the presence of a solvent.

2. An embedding mass comprising a ceramic substance hardening on burning, a substance capable of forming a hardening phosphate with phosphoric acid ions selected from the group consisting of oxides, hydroxides, phosphates and carbonates of a metal selected from the group consisting of alkaline earth metals, aluminium, iron, copper, zinc and cadmium, and a practically alkali-free substance yielding phosphoric acid ions in the presence of a solvent.

3. An embedding mass comprising a ceramic substance hardening on burning, a mixture of calcined zinc oxide and alumina hydrate, and a practically alkali-free acid substance yielding phosphoric acid ions in the presence of a solvent.

4. An embedding mass comprising a ceramic substance hardening on burning, a substance capable of forming a hardening phosphate with phosphoric acid ions, and primary magnesium phosphate.

5. An embedding mass comprising a ceramic substance hardening on burning, a substance capable of forming a hardening phosphate with phosphoric acid ions selected from the group consisting of oxides, hydroxides, phosphates and carbonates of a metal selected from the group consisting of alkaline earth metals, aluminium, iron, copper, zinc and cadmium, and primary magnesium phosphate.

6. An embedding mass comprising a ceramic substance hardening on burning, a mixture of calcined zinc oxide and alumina hydrate, and primary magnesium phosphate.

WALTER MOOSDORF.
PAUL WOLSKI.